(12) United States Patent
Balakier et al.

(10) Patent No.: US 11,700,060 B2
(45) Date of Patent: Jul. 11, 2023

(54) PHOTONIC PROCESSING OF RADIOFREQUENCY SIGNALS

(71) Applicant: Airbus Defence and Space Limited, Stevenage (GB)

(72) Inventors: Katarzyna Balakier, Portsmouth (GB); Laguna Victor Manuel Fernandez, Portsmouth (GB); Niall Andrew Macmanus, Portsmouth (GB); Stephen Phillip Brown, Portsmouth (GB)

(73) Assignee: Airbus Defence and Space Limited, Stevenage (GB)

( * ) Notice: Subject to any disclaimer, the term of this patent is extended or adjusted under 35 U.S.C. 154(b) by 0 days.

(21) Appl. No.: 17/924,201

(22) PCT Filed: May 12, 2021

(86) PCT No.: PCT/EP2021/062764
§ 371 (c)(1),
(2) Date: Nov. 9, 2022

(87) PCT Pub. No.: WO2021/229023
PCT Pub. Date: Nov. 18, 2021

(65) Prior Publication Data
US 2023/0121255 A1    Apr. 20, 2023

(30) Foreign Application Priority Data

May 12, 2020   (EP) .................................... 20174257
Jun. 10, 2020   (EP) .................................... 20179364

(51) Int. Cl.
*H04B 10/118*   (2013.01)
*H04B 7/185*    (2006.01)

(52) U.S. Cl.
CPC ....... *H04B 10/118* (2013.01); *H04B 7/18513* (2013.01); *H04B 2210/006* (2013.01)

(58) Field of Classification Search
None
See application file for complete search history.

(56) References Cited

U.S. PATENT DOCUMENTS 4,794,351 A  * 12/1988 Darcie ................. H01S 5/0608
                                                  359/245
7,826,752 B1 * 11/2010 Zanoni ................... H04B 10/60
                                                   398/186
(Continued)

FOREIGN PATENT DOCUMENTS

CN          110 365 401 A       10/2019
WO      WO 2017/031227 A1       2/2017

OTHER PUBLICATIONS

Aug. 2, 2021 Search Report issued in International Patent Application No. PCT/EP2021/062764; 3 pp.
(Continued)

*Primary Examiner* — Darren E Wolf
(74) *Attorney, Agent, or Firm* — Nelson Mullins Riley & Scarborough LLP

(57) ABSTRACT

Embodiments of the present invention comprise a signal processing method and apparatus for use in a satellite payload in which an input RF signal received at a receiver antenna is modulated by using a single optical carrier at the input of an optical modulator. The optical domain signal is processed and is subsequently combined with a single unmodulated optical LO tone to provide an output RF signal for radiation by a transmitter antenna or for further digital processing by an on-board processor. This results in a clean generation of the frequency-converted RF signal at the output of the opto-electrical conversion stage.

14 Claims, 2 Drawing Sheets

(56) References Cited

U.S. PATENT DOCUMENTS

| | | | | |
|---|---|---|---|---|
| 2002/0196506 A1* | 12/2002 | Graves | ............... | H04B 10/1125 |
| | | | | 398/126 |
| 2006/0024061 A1* | 2/2006 | Wirth | ................. | H04B 10/1125 |
| | | | | 398/129 |
| 2008/0298813 A1* | 12/2008 | Song | ................ | H04B 10/25758 |
| | | | | 398/178 |
| 2018/0006712 A1* | 1/2018 | Hreha | ............... | H04W 72/0453 |

OTHER PUBLICATIONS

Aug. 2, 2021 Written Opinion of the International Searching Authority issued in International Patent Application No. PCT/EP2021/062764; 10 pp.

May 2, 2022 Written Opinion of the International Preliminary Examining Authority issued in International Patent Application No. PCT/EP2021/062764; 8 pp.

Pan Shilong et al; "*Satellite Payloads Pay Off*;" IEEE Microwave Magazine; IEEESERVICE Center, Piscataway, NJ, US; vol. 16; No. 8;Sep. 1, 2015; pp. 61-73; XP011664614; retrieved on Jul. 30, 2015.

Lei Lihua et al; "Study on All-Optical Cross-Band Frequency Conversion for Communication Satellite;" 2017 IEEE 17$^{th}$ International Conference on Communication Technology (ICCT); IEEE; Oct. 27, 2017; pp. 1079-1082; XP033340064.

PCT Demand for International Preliminary Examination (Chapter II) submitted Mar. 11, 2022 in International Patent Application No. PCT/EP2021/062764.

\* cited by examiner

PHOTONIC PROCESSING OF RADIOFREQUENCY SIGNALS

CROSS-REFERENCE TO RELATED APPLICATIONS

This application claims priority to and is a 35 U.S.C. § 371 U.S. National Stage Application of International Application No. PCT/EP2021/062764, entitled "PHOTONIC PROCESSING OF RADIOFREQUENCY SIGNALS", filed May 12, 2021, which claims priority to (i) European Application No. 20174257.4, entitled "PHOTONIC PROCESSING OF RADIOFREQUENCY SIGNALS", filed May 12, 2020; and (ii) European Application No. 20179364.3, entitled "PHOTONIC PROCESSING OF RADIOFREQUENCY SIGNALS", filed Jun. 10, 2020, the contents of each being incorporated by reference herein in its entirety.

FIELD

The present invention relates to signal processing within a satellite payload, and particularly to signal processing in the optical domain prior to transmission from the payload in the radiofrequency (RF) domain.

TECHNICAL BACKGROUND

Satellites currently in operation utilise a number of different frequency bands (for example, the Ku, Ka, Q and V bands) for uplink/downlink transmission. The frequency conversion between these frequency bands is performed using harmonic mixers on-board the satellite. In case of digitally processed payload, an additional conversion to intermediate frequency (IF) or baseband frequency is required to enable the RF signals to be digitally processed.

Each frequency conversion step requires local oscillators (LOs) which need to be located in proximity to the mixer to avoid losses due to the long interconnects. This makes assembly and integration of bigger satellites a very demanding task. Moreover, the shift towards higher frequency requires higher-frequency LO signals, the distribution of which is affected by even higher losses.

To overcome these limitations, a photonic approach, exploiting the principle of heterodyning, can be considered for the generation of the signal at RF, and its associated microwave carrier.

An important advantage of the photonic solution is that the LO signals can be distributed optically inside the satellite with very-low-loss optical fibres instead of the rigid and prone-to-loss RF cables.

Photonic processing of RF signals within a satellite payload has been proposed previously, as set out in *Towards Demonstration of Photonic Payload for Telecom Satellites*, J. Anzalchi et al., and *Advanced Photonic Payloads for Broadband Telecom Satellites: Integration and Tests of a Representative Repeater Demonstrator*, S. Roux et al., (Proceedings Volume 11180, International Conference on Space Optics 2018).

In each of these prior techniques, electro-optical modulators modulate the received RF signals onto multiple coherent optical tones to enable frequency conversion operations to be performed via optical processing. The use of multiple optical carriers results in multiple mixing products when the signals are converted back from the optical domain to the RF domain using opto-electrical converters such as photomixers. Frequency sidebands and spurious mixing products must be filtered out. The presence of such sidebands means that only limited frequency spacing between the optical tones is possible.

In order to generate such coherent optical tones, use of directly modulated vertical-cavity side-emitting lasers (VCSELs), or external modulation of a single-mode laser are typically considered for use in a frequency generation unit (FGU). The FGU can be located in any part of the satellite body, and the optical tones are subsequently transported through optical fibre for modulation, or conversion into an electrical LO is signal.

As the frequency of the transmission link increases into the Ka (27-40 GHz) and Q and V bands (40-60 GHz), a greater separation between the optical tones is required, which cannot be easily obtained through the techniques described above.

According to embodiments of the present invention, improvements to the use of photonic signal processing arise through rearrangement of the order of frequency-conversion and signal processing stages, such that frequency conversion is applied after photonic signal processing is performed. Embodiments of the present invention comprise modulating an input RF signal received at a receiver antenna by using a single optical carrier at the input of an optical modulator. The optical domain signal is processed and is subsequently combined with a single unmodulated optical LO tone to provide an output RF signal for radiation by a transmitter antenna. This results in a cleaner generation of the RF signal at the output of the photomixer.

According to an aspect of the present invention, there is provided a signal processing method for a satellite payload, comprising: receiving a plurality of first input radiofrequency, RF, signals on each of a respective plurality of first channels; outputting a plurality of first output RF signals on each of the plurality of first channels; for each first channel: modulating a single optical tone of a respective first wavelength using the received first input RF signal, to produce a modulated optical signal of the respective first wavelength; photonically processing the modulated optical signal to produce a processed signal; combining the processed signal with a local oscillator signal to produce a combined optical signal, wherein the local oscillator signal is a single optical tone of a respective second wavelength; and using an opto-electrical converter to convert the combined optical signal into the RF domain to produce a first output RF signal.

The optical tone of the respective first wavelength and the optical tone of the respective second wavelength for each first channel may be substantially coherent, and have a predetermined wavelength offset between them.

Photonically processing the modulated optical signal may comprise at least one of: amplifying, filtering, switching, multiplexing/demultiplexing, combining/splitting, amplitude adjustment, time offset adjustment and phase adjustment.

The first output RF signals may be processed by a digital signal processing stage which outputs a plurality of RF signals on a plurality of second channels, and the method may further comprise, for each of the plurality of second channels: modulating an optical tone of a respective third wavelength using the RF signal output by the digital processing stage, to produce a further modulated optical signal of the respective third wavelength; photonically processing the further modulated optical signal to produce a further processed signal; combining the further processed signal with a local oscillator signal to produce a further combined optical signal, wherein the local oscillator signal is an optical tone of a respective fourth wavelength; and using an opto-electrical converter to convert the further combined optical signal into the RF domain to produce a second output RF signal.

The optical tone of the respective third wavelength and the optical tone of the respective fourth wavelength for each channel may be substantially coherent, and have a predetermined wavelength offset between them.

The method may further comprise receiving at least one control signal from a ground station, and tuning the respective first and second wavelengths in accordance with the at least one control signal.

According to another aspect of the present invention, there is provided an apparatus comprising: a first input stage for receiving a plurality of first input radiofrequency, RF, signals on each of a respective plurality of first channels; a first output stage for transmitting a plurality of first output RF signals on each of the plurality of first channels; and a first photonic processing stage; wherein the first input stage comprises a modulator for each first channel, arranged to modulate a single optical tone of a respective first wavelength using the first input RF signal, to produce a modulated optical signal of the respective first wavelength; wherein the first photonic processing stage comprises photonic processing means to process the modulated optical signal for each first input channel to produce a processed signal for each first channel; and wherein the first output stage comprises: an optical coupler, for each first channel, to combine the processed signal with a local oscillator signal to produce a combined optical signal, wherein the local oscillator signal is a single optical tone of a respective second wavelength; and an opto-electrical converter for each first channel to convert the combined optical signal into the RF domain to produce a first output RF signal.

The apparatus may further comprise a frequency generation unit for generating the optical tone of the respective first wavelength and the optical tone of the respective second wavelength of each first channel to be substantially coherent and have a predetermined wavelength offset between them.

The apparatus may comprising means for receiving at least one control signal from a ground station and for controlling the frequency generation unit to tune the respective first and second wavelengths in accordance with the at least one control signal while the apparatus is in-orbit, and/or for controlling the first photonic processing stage.

The apparatus may further comprise a digital processing stage arranged to perform digital signal processing on the first output RF signals produce a digitally processed RF signal on each of a plurality of second channels; a second input stage for receiving the plurality of digitally processed RF signals on each of the plurality of second channels; a second output stage for transmitting a plurality of second output RF signals on each of the plurality of second channels; and a second photonic processing stage; wherein the second input stage comprises a modulator for each of the second channels, arranged to modulate an optical tone of a respective third wavelength using the digitally processed RF signal, to produce a further modulated optical signal of the respective third wavelength; wherein the second photonic processing stage comprises photonic processing means to process the further modulated optical signal for each second channel to produce a further processed signal for each second channel; and wherein the second output stage comprises: an optical coupler, for each second channel, to combine the further processed signal with a local oscillator signal to produce a further combined optical signal, wherein the local oscillator signal is an optical tone of a respective fourth wavelength; and an opto-electrical converter for each second channel to convert the further combined optical signal into the RF domain to produce a second output RF signal.

The frequency generation unit may be arranged to generate the optical tone of the respective third wavelength and the optical tone of the respective fourth wavelength of each second channel to be substantially coherent and with a predetermined wavelength offset between them.

The means for receiving at least one control signal from a ground station may be further arranged to control the frequency generation unit to tune the respective third and fourth wavelengths and/or the second photonic processing stage and/or the digital processing stage in accordance with the at least one control signal while the apparatus is in-orbit.

Each opto-electrical converter may be a heterodyne photomixer, and the apparatus may further comprising an optical fibre for distributing each optical tone from the frequency generation unit to each respective heterodyne photomixer.

According to an aspect of the present invention, there is provided a satellite payload comprising the apparatus described above.

According to a further aspect of the present invention, there is provided a signal processing method for a satellite payload, comprising receiving a plurality of first input optical signals on each of a respective plurality of first channels; photonically processing the optical signals to produce processed signals; for each first channel, combining the processed signal with a respective local oscillator signal to produce a combined optical signal, wherein each respective local oscillator signal is a single optical tone; and using an opto-electrical converter to convert the combined optical signal of each first channel into the RF domain to produce a first output RF signal.

The embodiments which are described have the potential to offer greater frequency agility, improved spectral purity with lower spurious mixing products, with a reduced number of RF components, reducing mass and volume.

DESCRIPTION OF DRAWINGS

Embodiments of the present invention will be described by way of example in connection with the following drawings, in which.

DETAILED DESCRIPTION

Figure 1:
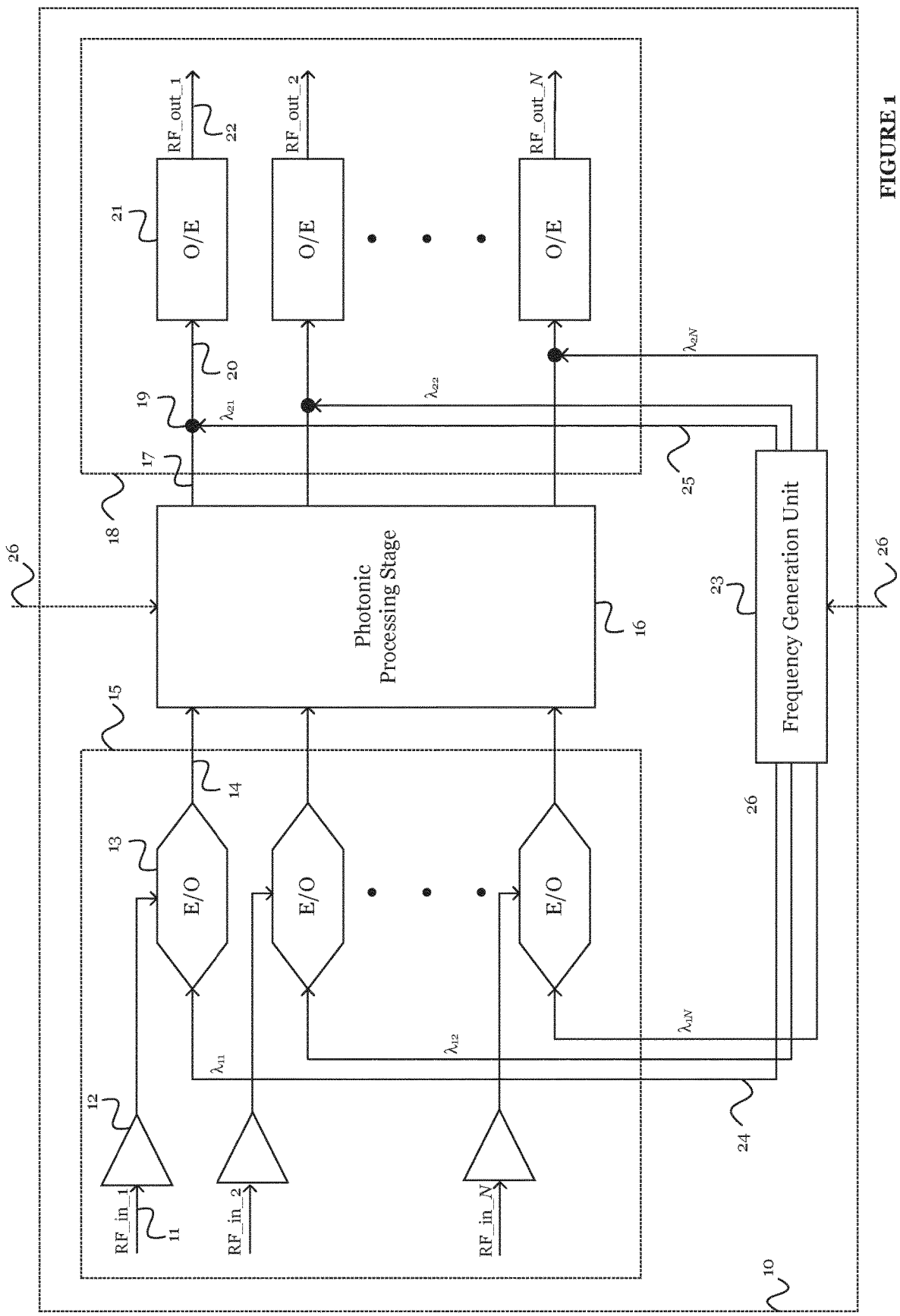
FIG. 1 is a schematic showing a signal processing technique according to embodiments of the present invention.

FIG. 1 is a schematic showing a signal processing technique according to methods is and as implemented on apparatus according to embodiments of the present invention. The signal processing technique which is illustrated is applied in both the electrical and optical domains, converting RF input signals received via a satellite uplink into RF output signals for transmission via a downlink.

The signal processing technique is implemented on hardware and software comprised within a satellite payload 10. The satellite payload 10 interfaces to a transmit/receive antenna, or two separate transmit and receive antennas, via a RF front/back end, as known in the art.

In more detail, a plurality of RF input signals 11, RF_in_1 . . . RF_in_N, are received on a plurality of N input channels from a receiver antenna, filtered by the RF front end, and each is amplified by a channel amplifier 12. In the description that follows, and in the schematic of FIG. 1, reference signs are provided in relation to one of the N input channels for ease of explanation, and it will be appreciated that corresponding explanation applied to other of the N input channels.

The amplified RF_in signals 11 are converted into the optical domain via an electro-optical (E/O) conversion stage 13. The optical domain signals are processed photonically, before opto-electrical (O/E) conversion 21 back into the RF domain.

The RF-domain signals converted in this manner are present on a plurality of N output channels, as a plurality of output signals 22, RF_out_1 ... RF_out_N, and RF_out 22 are output either to an amplifier and a transmit antenna, in the case of an analogue payload, or to an amplifier and an analogue-to-digital converter, in the case of a digitally processed payload.

In the description that follows, and in the schematic of FIG. 1, reference signs are provided in relation to one of the N output channels for ease of explanation, and it will be appreciated that corresponding explanation applies to the other of the N output channels.

In the embodiment illustrated in FIG. 1, the N input and output channels are referred to herein as "first channels" to enable distinction from further channels to be described in more detail below.

The arrangement shown in FIG. 1 may be divided logically and/or physically into an input stage 15, a processing stage, 16 and an output stage 18. Each of the input stage 15, processing stage, 16 and output stage 18 is controlled in accordance with one or more dedicated controllers (not shown), or by the on-board controller of the satellite payload 10 (not shown).

The input stage 15 comprises the receipt of the RF_in signals ii, their amplification 12 and electro-optical conversion 13. In alternative embodiments of the present invention, the provision of RF_in signals from a receive antenna, and their amplification, although part of the satellite payload 10, do not form part of the input stage 15 of the claimed apparatus and exist in a pre-input stage (not shown).

The processing stage 16 comprises photonic processing components arranged to perform at least one of: amplifying, filtering, switching, multiplexing/demultiplexing, combining/splitting, amplitude adjustment, time offset adjustment and phase adjustment. The specific combination of operations to be performed will be dependent on particular applications and system requirements, and it may be that different combinations of operations are required to be performed on different ones of the first channels. In some embodiments, it may be that none of the above operations is processed on some or all of the first channels. The photonic processing stage comprises a plurality of photonic processors arranged to perform the required operations in the optical domain.

The output stage 18 comprises the opto-electrical conversion 21 of signals and the output of the RF_out signals 22.

In more detail, the electro-optical conversion stage 13 for each of the N first channels comprises modulating a single optical tone 24 of a first wavelength ($\lambda_{11}, \lambda_{12}, \ldots \lambda_{1N}$) using the respective RF_in signal 11, to produce a modulated optical signal 14 of the first wavelength which is supplied to the processing stage 16. The modulation is performed using an electro-optical modulator, EOM, on each channel.

The optical tone 24 of the first wavelength is produced by a frequency generation unit, FGU 23, which is located in the satellite payload 10. The optical tone 24 is provided from the FGU 23 by a low-loss broadband optical fibre for each of the first channels to the respective EOM of the E/O stage 13.

The O/E stage 21 used in the output stage 18 is preceded by an optical coupler 19 for each first channel to combine a processed optical signal 17 output from the processing stage 16 with an optical local oscillator, LO, signal 25. The combined signal 20 is then converted, in the O/E stage 21, using an opto-electrical converter, which may be a heterodyne photomixer such as a photodiode, to generate RF_out signals 22. The RF_out signals 22 may have a different frequency from the RF_in signals 11.

The LO signal 25 is generated by the FGU 23, and is provided by a low-loss broadband optical fibre, for each of the first channels, to the respective optical coupler 19 of the output stage 18. The LO signal 25 is an optical tone of a second wavelength ($\lambda_{21}, \lambda_{22}, \ldots \lambda_{2N}$), for each of the N first channels.

In the arrangement of embodiments of the present invention, the first and second optical tones 24, 25 for each first channel are thus separated at the output of the FGU 23. In comparison with systems of the prior art, this enables the exact frequency and phase of the generated electrical signal in the output stage 18 to be defined by adjustment of the second wavelengths, $\lambda_{21} \ldots \lambda_{2N}$. The absolute frequency of each transmitted RF_out signal 22 is defined by the frequency offset of the two optical tones 24, 25 for that channel, and can be adjusted at Hertz-level tunability by appropriate control of the FGU 23, which can be achieved, for instance, by implementation of Optical Phase Lock Loop, as set out in *Integrated Semiconductor Laser Optical Phase Lock Loops, IEEE Journal of Selected Topics in Quantum Electronics*.

For each of the N channels, the first and second wavelengths are tuned so that their offset enables the desired frequency of RF_out to be achieved. The wavelengths of optical tones on different channels may be different, or all the same. For example, the optical tones may be derived from a single laser in the FGU 23, and power-split, or may be derived from multiple lasers. As such, each wavelength $\lambda_{11}, \lambda_{12}, \ldots \lambda_{1N}$ may be different, or alternatively, $\lambda_{11}=\lambda_{12}=\lambda_{1N}$. Similarly, $\lambda_{21}, \lambda_{22}, \ldots \lambda_{2N}$ may each be different or alternatively, $\lambda_{21}=\lambda_{22}=\lambda_{2N}$, provided the relationship between the first and second wavelength is maintained on each channel.

In some embodiments, such FGU control is achieved by arranging a sub-controller within the FGU 23 for each of the N channels, such that each sub-controller controls a pair of lasers to generate respective first and second optical tone pairs ($\{\lambda_{11}, \lambda_{21}\}, \{\lambda_{12}, \lambda_{22}\}, \ldots, \{\lambda_{1N}, \lambda_{2N}\}$). The sub-controller may be implemented via hardware, software, or a combination of both, and such a sub-controller may be responsible for maintaining coherence as described below. In alternative embodiments, a single FGU controller may be used in place of two or more sub-controllers, again implemented in hardware, software, or a combination of both.

The main product of the O/E conversion 21 is the desired electrical signal, with no spurious mixing product within the frequency band in which it is to be transmitted. This increases the frequency range that is free of spurious mixing products, and reduces the filtering requirement to remove the mixing products that would otherwise be present through the modulating of each RF_in signal onto multiple optical tones.

As a consequence, extensive frequency agility (tuneability, and frequency up and down-conversion) can be achieved by slight tuning of the second wavelength. As above, the FGU 23 may comprise a laser to provide the optical tone, and an FGU controller for driving the laser at the desired wavelength and in this instance, 1 nm laser tuning may correspond to more than 120 GHz of RF frequency tuning.

The first and second wavelengths may be substantially coherent, having a predetermined phase relationship. In addition, there may be a predetermined relationship between the two wavelengths, represented by a particular offset which may be zero in some embodiments.

In some embodiments, processing is applied to the optical tones 24, 25 to maintain their coherence, particularly as the optical fibre lengths increase. The specific mechanism used to maintain coherence will depend on the overall implementation and the degree of decoherence which would otherwise be expected, as known in the art. In some embodiments, small level of decoherence between the optical tones 23, 24 may be acceptable, maintained at one or more stages along, or after each optical fibre. The phase coherence may be maintained by a dedicated coherence processor, or this functionality may be provided by the on-board controller of the satellite payload 10, or the controllers and/or sub-controllers of the FGU 23.

In some embodiments, the FGU 23 additionally receives, either directly via the uplink/download coupled to the payload, or via a system controller such as the on-board controller of the satellite payload 10, one or more control signals 26 from a ground station to enable in-orbit remote configuration of the optical tones while the satellite payload is in orbit. Such ground control signals 26 may also be applied to the photonic processing stage 16, which enables in-orbit reconfiguration. As a consequence of such reconfigurability, the number of redundant channels to be used can be reduced, as the system can be reconfigured in a more dynamic and intelligent manner using its available resources. In alternative embodiments, local reconfigurability is possible which does not require such ground control based on predetermined scheduling of use of particular optical tones, or the like.

Figure 2:
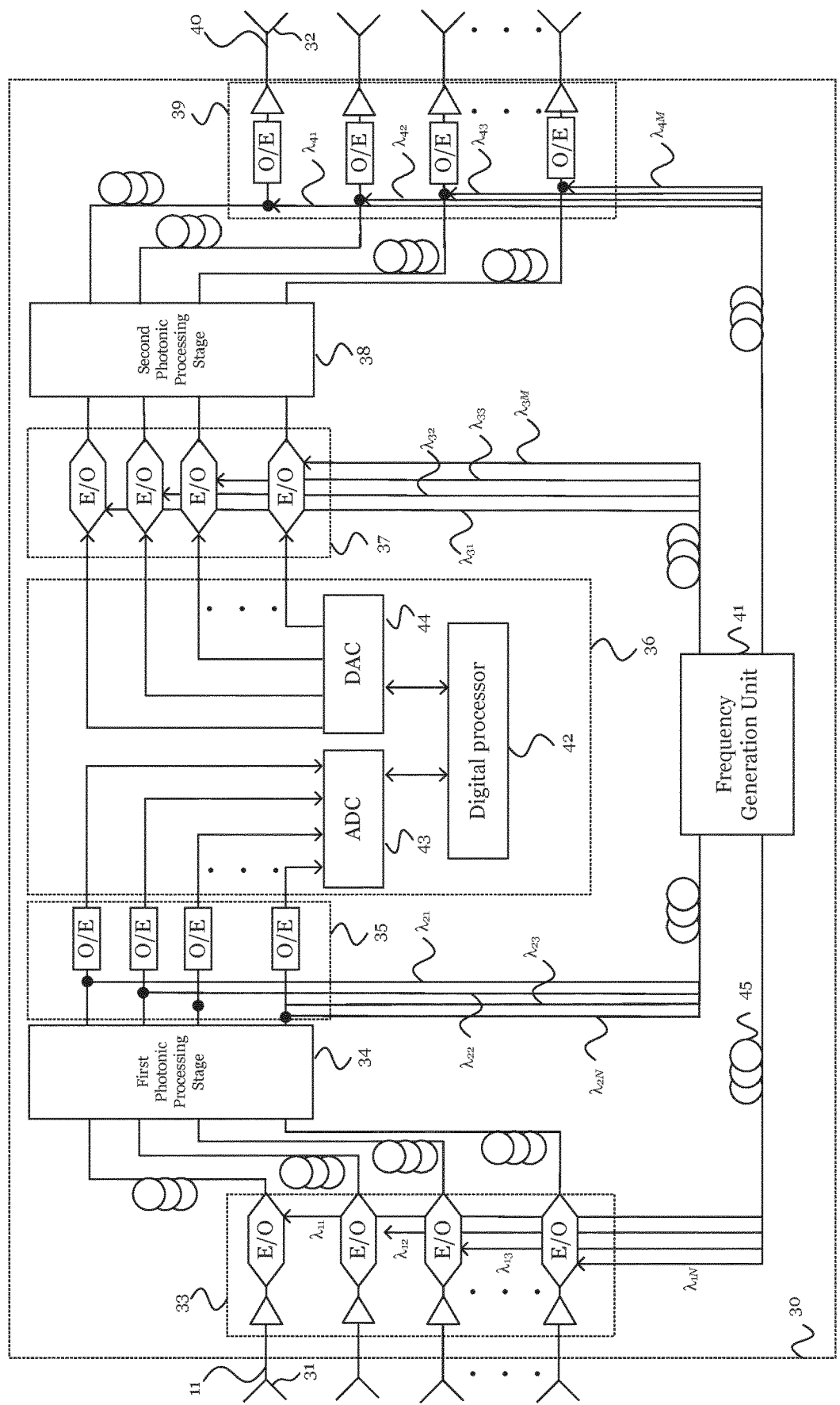
FIG. 2 is a schematic showing a signal processing technique according to further embodiments of the present invention.

FIG. 2 is a schematic showing a signal processing technique according to further embodiments of the present invention. The signal processing technique is implemented by hardware and software comprised within satellite payload 30. The satellite payload 30 interfaces to a transmit/receive antenna, or two separate antennas via RF front end networks as known in the art. In the embodiments represented by FIG. 2, elements 31 of a receive antenna, and elements 32 of a transmit antenna are illustrated.

The arrangement of FIG. 2 contains elements in common with those of FIG. 1, but the satellite payload 30 is a digital RF payload. In summary, whereas FIG. 1 contains what is referred to herein as a single "RF-optical-RF" process, per channel, in which an RF_in signal is converted into the optical domain, processed photonically, and converted to RF_out, the embodiments shown in FIG. 2 effectively represent two instances of this RF-optical-RF process, separated by a digital processing stage 36. In a first processing segment arranged prior to the digital processing stage, a first input stage 33 corresponds to the input stage 15 of FIG. 1, operating on input RF_in signals 11. A first photonic processing stage 34 corresponds to the photonic processing stage 16 of FIG. 1, and a first output stage 35 corresponds to output stage 18 of FIG. 1. Detailed description of these components is omitted in the interests of conciseness.

As with FIG. 1, the amplification of RF_in signals is illustrated as within the apparatus of embodiments of the present invention, but in alternative embodiments, this may take place within the satellite payload, but outside of the claimed apparatus. Similarly, amplification of RF_out signals for transmission is illustrated as within the apparatus of embodiments of the present invention, but in alternative embodiments, this may take place within the satellite payload, but outside of the claimed apparatus.

FIG. 1 illustrates the possibility that the RF_out signals 22 may be applied to a digital signal processing stage, and in FIG. 2, such a digital signal processing stage 36 is illustrated as comprising a digital processor 42. An analogue-to-digital process is performed on RF_out signals for input to the digital processor 42 via an analogue-to-digital converter (ADC) stage 43, and digital-to-analogue conversion is performed at the output of the digital processor 42 using a digital-to-analogue converter (DAC) stage 44 before second input stage 37). The output of the digital processing stage 36 forms the input to a second input stage 37 of a second processing segment in which an "RF-optical-RF" sequence is present. The second input stage interfaces with a second photonic processing stage 38 which has functionality as described in relation to the first photonic processing stage, but here, a different combination of operations may be performed in the optical domain from those described in relation to the first photonic processing stage 34, such that the first and second photonic processing stages 34, 38 provide the required operations in combination. The output of the second photonic processing stage 38 is provided to a second output stage 39, which outputs RF signals 40 for transmission via transmit elements 32.

As a result of the digital signal processing to be performed, the digital processor 42 may be responsible for changing the number of signal channels which are present, as well as at least one of frequency conversion, routing, and other digital signal processes required by a particular application. As such, whereas N RF_out channels may be received from the first RF-optical-RF segment, output by the first output stage 35, the digital processing stage 36 may output M channels, such that there are M RF_in signals applied to the second RF-optical-RF segment, and M RF_out signals 40 provided to the transmit antenna 32. The M channels are referred to herein as "second channels", in contrast to the aforementioned first channels.

The frequency generation unit 41 generates first and second optical tones, for use on each of the N channels of the first RF-optical-RF segment, having respective first and second wavelengths, in a manner analogous to FGU 32 of FIG. 1. As with FIG. 1, the FGU 41 is capable of ensuring, and maintaining, substantial coherence between the two optical tones.

Additionally, FGU 41 generates optical tones for use on each of the M channels in the second RF-optical-RF segment, of third and fourth wavelengths. The FGU 41 is capable of ensuring, and maintaining, substantial coherence between the optical tones of third and fourth wavelengths, with a predetermined wavelength offset between pairs of tones on each channel. As with the FGU 23 of FIG. 1, FGU 41 may employ sub-controllers to modulate a single laser or multiple pairs of lasers to generate pairs of optical tones ($\{\lambda_{31}, \lambda_{41}\}, \{\lambda_{32}, \lambda_{42}\}, \ldots, \{\lambda_{3M}, \lambda_{4M}\}$).

An alternative approach relies on the selection of two optical lines from an optical frequency comb which consists of multiple optical tones that are equally separated in frequency and that are phase-correlated. The selection of the comb lines can be achieved through highly selective and tuneable optical filters or laser-locking techniques such as optical injection or optical phase locking. This alternative approach is also available in relation to the embodiments shown in FIG. 1.

The RF signals 40 which are output by the second output stage 39 have a frequency defined (with respect to those output by the digital processing stage 36) by the difference between the third and fourth optical wavelengths.

For each of the M channels, the third and fourth wavelengths are tuned so that their offset enables the desired frequency of RF_out to be achieved. The wavelengths of optical tones on different channels may be different, or all the same. For example, the optical tones may be derived from a single laser in the FGU 41, and power-split, or may be derived from multiple lasers. As such, each wavelengths $\lambda_{31}$, $\lambda_{32}$ ... $\lambda_{3M}$ may be different, or alternatively, $\lambda_{31}=\lambda_{32}=\lambda_{3M}$. Similarly, $\lambda_{41}$, $\lambda_{42}$, ... $\lambda_{4M}$ may each be different or alternatively, $\lambda_{41}=\lambda_{42}=\lambda_{4M}$, provided the relationship between the third and fourth wavelengths is maintained on each channel. Similarly, the first and second wavelengths of each of the N channels may be varied between the N channels, provided the required relationship between the first and second wavelengths is maintained on each channel.

Optical tones of third wavelengths $\lambda_{31}$, $\lambda_{32}$, $\lambda_{33}$ ... $\lambda_{3M}$ represent the optical tone to be modulated by the RF output of the digital processing stage 35 in the E/O stage of the second input stage. The optical tones of the third wavelengths are analogous to the optical tones of first wavelengths $\lambda_{11}$, $\lambda_{12}$, $\lambda_{13}$ ... $\lambda_{1M}$.

Optical tones of fourth wavelengths $\lambda_{41}$, $\lambda_{42}$, $\lambda_{43}$ ... $\lambda_{4M}$ represent the optical tone which is acts as a LO signal when provided to the coupler prior to the O/E stage of the second output stage 39. The optical tones of the fourth wavelengths are analogous to the optical tones of second wavelengths $\lambda_{21}$, $\lambda_{22}$, $\lambda_{23}$ ... $\lambda_{2N}$.

Each of the optical tones of first, second, third and fourth wavelength is transmitted via a low-loss broadband optical fibre from the FGU 41 to its required destination in the satellite payload 30. The optical fibres are represented schematically on the FGU outputs in FIG. 2, for example component 45.

The FGU 41 is capable of receiving ground control signals (not shown) in the manner of FIG. 1, as to control each of the first, second, third and fourth wavelengths in-orbit. Additionally, both the first and second photonic processing stages 34, 38 and the digital processing stage 36 may be controlled in-orbit from a ground station.

Due to the use of a single optical tone in each of the first and second E/O stages, the advantages of the embodiment of FIG. 1 can be applied to a digital satellite payload in an analogous manner. The third and fourth optical tones are separated at the FGU output in the same manner as the first and second optical tones.

In both embodiments of FIGS. 1 and 2, the propagation of a single-tone optical LO on a dedicated path is less affected by optical loss, leading to self-coherent gain and amplification of RF signal power in comparison to alternative techniques. The use of photonic processing stages and the ordering of frequency conversion and processing stages enables greater frequency agility for the system with a reduced number of RF components, which in turn leads to a mass and volume reduction.

The skilled person would appreciate that a variety of configurations are possible which fall within the scope of the claims, in dependence on the specific types of photonic and digital processing to be performed, and the number of channels. Additionally, although embodiments of the present invention are described above in connection with input RF signals, it will be appreciated that in modifications to the described architecture, input optical signals can be considered (such as optical feederlink, or inter-satellite links), in which the E/O stage of FIG. 1, or the first E/O stage of FIG. 2 are omitted, but other stages, involving mixing of photonically processed signals with a single optical tone as an optical LO signal, are performed.

The invention claimed is:

1. A signal processing method for a satellite payload, comprising:
  receiving a plurality of first input radiofrequency, RF, signals on each of a respective plurality of first channels;
  outputting a plurality of first output RF signals on each of the plurality of first channels;
  for each first channel:
    modulating a single optical tone of a respective first wavelength using the received first input RF signal, to produce a modulated optical signal of the respective first wavelength;
    photonically processing the modulated optical signal to produce a processed signal;
    combining the processed signal with a local oscillator signal to produce a combined optical signal, wherein the local oscillator signal is a single optical tone of a respective second wavelength; and
  using an opto-electrical converter to convert the combined optical signal into the RF domain to produce a first output RF signal,
  the method further comprising:
  receiving at least one control signal from a ground station, and tuning the respective first and second wavelengths in accordance with the at least one control signal.

2. A signal processing method according to claim 1, wherein the optical tone of the respective first wavelength and the optical tone of the respective second wavelength for each first channel are substantially coherent, and have a predetermined wavelength offset between them.

3. A signal processing method according to claim 1, wherein photonically processing the modulated optical signal comprises at least one of: amplifying, filtering, switching, multiplexing/demultiplexing, combining/splitting, amplitude adjustment, time offset adjustment and phase adjustment.

4. A signal processing method according to claim 1, wherein the first output RF signals are processed by a digital signal processing stage which outputs a plurality of RF signals on a plurality of second channels, the method further comprising:
  for each of the plurality of second channels:
    modulating an optical tone of a respective third wavelength using the RF signal output by the digital processing stage, to produce a further modulated optical signal of the respective third wavelength;
    photonically processing the further modulated optical signal to produce a further processed signal;
    combining the further processed signal with a local oscillator signal to produce a further combined optical signal, wherein the local oscillator signal is an optical tone of a respective fourth wavelength; and
    using an opto-electrical converter to convert the further combined optical signal into the RF domain to produce a second output RF signal.

5. A signal processing method according to claim 4, wherein the optical tone of the respective third wavelength and the optical tone of the respective fourth wavelength for each channel are substantially coherent, and have a predetermined wavelength offset between them.

6. An apparatus comprising:
a first input stage for receiving a plurality of first input radiofrequency, RF, signals on each of a respective plurality of first channels;
a first output stage for transmitting a plurality of first output RF signals on each of the plurality of first channels; and
a first photonic processing stage;
wherein the first input stage comprises a modulator for each first channel, arranged to modulate a single optical tone of a respective first wavelength using the first input RF signal, to produce a modulated optical signal of the respective first wavelength;
wherein the first photonic processing stage comprises photonic processing means to process the modulated optical signal for each first input channel to produce a processed signal for each first channel;
wherein the first output stage comprises:
an optical coupler, for each first channel, to combine the processed signal with a local oscillator signal to produce a combined optical signal, wherein the local oscillator signal is a single optical tone of a respective second wavelength; and
an opto-electrical converter for each first channel to convert the combined optical signal into the RF domain to produce a first output RF signal, and
wherein the apparatus further comprises a frequency generation unit to tune the respective first and second wavelength, and means for receiving at least one control signal from a ground station and for controlling the frequency generation unit to tune the respective first and second wavelength in accordance with the at least one control signal while the apparatus is in orbit.

7. An apparatus according to claim 6, wherein the frequency generation unit is arranged to generate the optical tone of the respective first wavelength and the optical tone of the respective second wavelength of each first channel to be substantially coherent and have a predetermined wavelength offset between them.

8. An apparatus according to claim 6, wherein the first photonic processing stage is configured to perform at least one of: amplifying, filtering, switching, multiplexing/demultiplexing, combining/splitting, amplitude adjustment, time offset adjustment and phase adjustment.

9. An apparatus according to claim 8, wherein the means for receiving at least one control signal from a ground station is arranged to control the first photonic processing stage.

10. An apparatus according to claim 6, further comprising a digital processing stage arranged to perform digital signal processing on the first output RF signals produce a digitally processed RF signal on each of a plurality of second channels;
a second input stage for receiving the plurality of digitally processed RF signals on each of the plurality of second channels;
a second output stage for transmitting a plurality of second output RF signals on each of the plurality of second channels; and
a second photonic processing stage;
wherein the second input stage comprises a modulator for each of the second channels, arranged to modulate an optical tone of a respective third wavelength using the digitally processed RF signal, to produce a further modulated optical signal of the respective third wavelength;
wherein the second photonic processing stage comprises photonic processing means to process the further modulated optical signal for each second channel to produce a further processed signal for each second channel; and
wherein the second output stage comprises:
an optical coupler, for each second channel, to combine the further processed signal with a local oscillator signal to produce a further combined optical signal, wherein the local oscillator signal is an optical tone of a respective fourth wavelength; and
an opto-electrical converter for each second channel to convert the further combined optical signal into the RF domain to produce a second output RF signal.

11. An apparatus according to claim 10, wherein the frequency generation unit is arranged to generate the optical tone of the respective third wavelength and the optical tone of the respective fourth wavelength of each second channel to be substantially coherent and with a predetermined wavelength offset between them.

12. An apparatus according to claim 11, wherein the means for receiving at least one control signal from a ground station is further arranged to control the frequency generation unit to tune the respective third and fourth wavelengths and/or the second photonic processing stage and/or the digital processing stage, in accordance with the at least one control signal while the apparatus is in-orbit.

13. An apparatus according to claim 11, wherein each opto-electrical converter is a heterodyne photomixer,
the apparatus further comprising an optical fibre for distributing each optical tone from the frequency generation unit to each respective heterodyne photomixer.

14. A satellite payload comprising the apparatus of claim 6.

* * * * *